United States Patent [19]

Egert et al.

[11] Patent Number: 4,667,931

[45] Date of Patent: May 26, 1987

[54] CAM-ACTUATED DIAPHRAGM VALVE

[75] Inventors: Allen C. Egert, North Andover; Charles J. Casey, Reading; Claudio P. Negro, Lynn, all of Mass.

[73] Assignee: Wingaersheek Division of Victor Equipment Co., Danvers, Mass.

[21] Appl. No.: 793,916

[22] Filed: Nov. 1, 1985

[51] Int. Cl.⁴ ........................................ F16K 31/00

[52] U.S. Cl. ................................ 251/340; 251/96; 251/263; 251/335.2; 251/342; 251/348

[58] Field of Search ............... 251/340, 257, 263, 342, 251/347, 348, 95, 96, 339, 148

[56] References Cited

U.S. PATENT DOCUMENTS

| | | | |
|---|---|---|---|
| 1,085,839 | 2/1914 | Acton | 251/340 |
| 1,150,641 | 8/1915 | Smith | 251/96 |
| 1,574,768 | 3/1926 | Tuttle | 251/263 |
| 2,657,709 | 11/1953 | Gillerstrom et al. | 251/340 |
| 2,732,166 | 1/1956 | Rayner, Jr. | 251/335.2 |
| 3,223,122 | 12/1965 | Banker | 251/263 |
| 3,645,500 | 2/1972 | Walter | 251/340 |
| 4,366,836 | 1/1983 | Villari | 251/342 |

FOREIGN PATENT DOCUMENTS

| | | | |
|---|---|---|---|
| 565183 | 8/1957 | Italy | 251/96 |
| 616774 | 2/1961 | Italy | 251/348 |

*Primary Examiner*—A. Michael Chambers

*Attorney, Agent, or Firm*—Majestic, Gallagher, Parsons & Siebert

[57] ABSTRACT

A cam-actuated valve is provided which includes a valve chamber having a poppet valve therein. A diaphragm separates the exterior of the valve body from fluid contained within the valve chamber. An actuator sleeve is positioned on the body for rotational and longitudinal motion. The vlave sleeve is spring-biased into a closed or "off" position by moving the actuator sleeve against the biased spring and rotating the spring about thirty degrees. The valve is moved to the "open" position. A cam forces a ball to move in a radial direction so as to open the poppet of the valve and thereby allow fluid to flow from an inlet to an outlet through the valve assembly. Locking means are provided whereby the valve is locked in the closed position.

7 Claims, 6 Drawing Figures

CAM-ACTUATED DIAPHRAGM VALVE

BACKGROUND OF THE INVENTION

1. Field of the Invention

This invention is directed to an improved cam-actuated diaphragm valve. The valve has special application for use with gas-operated hand torches.

2. Description of the Prior Art

Numerous valve structures exist in the prior art for use in channeling or directing fluids. Some of these are spool valves wherein a spool having a series of openings thereon is adapted for selectively communicating ports within a valve body upon manual movement of the spool. Other prior art valves are of the needle or ball valve type. Needle valves frequently have very short travel and are actuated by means of manually turning a valve wheel or handle. These valves are hard to operate and adjust by an operator having to wear heavy gloves such as in welding applications.

When used with welding gases such as propane, these valves may be susceptible to leakage, as O-ring seals used therein become worn. This may require frequent servicing or replacement of the valve assembly.

Another problem encountered with some prior art valves is that they are difficult to operate with one hand. A needle valve, for example, usually requires twohand operation. In addition, these valves do not provide operator "feel" to give indication of their open or closed positions.

Still another problem encountered in welding operations is the valve is not always presented to the operator in the correct position for actuation due to twisting of the gas hose attached thereto. Still further, dropping some prior art valves could present a risk of inadvertent unwanted opening and discharge of combustible gas. It is to a solution of these and other problems that the subject invention is directed.

While the following description talks in terms of a valve for use in welding applications, it is to be understood that it is not to be so specifically limited. The valve herein described may be used with other applications wherein fluids are desired to be controlled.

SUMMARY AND OBJECTS OF THE INVENTION

The invention comprises a valve located within a body having an inlet and an outlet on a longitudinal axis. The valve is contained within a chamber within the body. Inlet and outlet passages access the chamber. The valve body is generally elongated in shape and has an annular sleeve fitted for rotational and longitudinal movement therearound. The valve itself comprises a valve seat located within the bottom of the chamber, and a spring-biased valve poppet which is actuable into and out of sealing engagement with an O-ring seal located intermediate the valve seat and the poppet. A valve stem passing through an aperture and valve seat is fixed at one end thereof to the poppet. The other end of the valve stem is positioned adjacent a diaphragm which seals the entire valve assembly by means of a diaphragm retainer. A cam mechanism translates rotational movement of the sleeve into linear movement whereby the valve is selectively actuated into the open and closed positions. The cam mechanism includes cam surface on the interior of the sleeve which moves a ball loosely held within the diaphragm retainer against the diaphgram and thereby the valve stem. The locking means is also provided whereby the sleeve must be first moved in the axial direction to unseat a detent prior to any rotation thereof. Spaced ribs around the sleeve permit the valve to be actuated in any angular position of the valve body.

It is therefore a primary object of this invention to provide an improved cam-actuated valve.

It is a further object to provide a cam-actuated valve which is easily operated by one hand.

It is a further object of this invention to provide such a valve with improved seal characteristics and longevity.

It is a further object to provide a valve which has a mechanism for locking against unwanted actuation.

It is a still further object to provide such a cam-actuated valve which is actuable in any rotational position of the valve body containing the valve.

It is a further object of this invention to provide a cam-actuated valve which gives position operator "feel" together with visual indication of the operative position.

Further and other objects and advantages will become more apparent by having reference to the accompanying drawings and the following detailed description and claims.

DETAILED DESCRIPTION OF THE DRAWINGS

Figure 1:
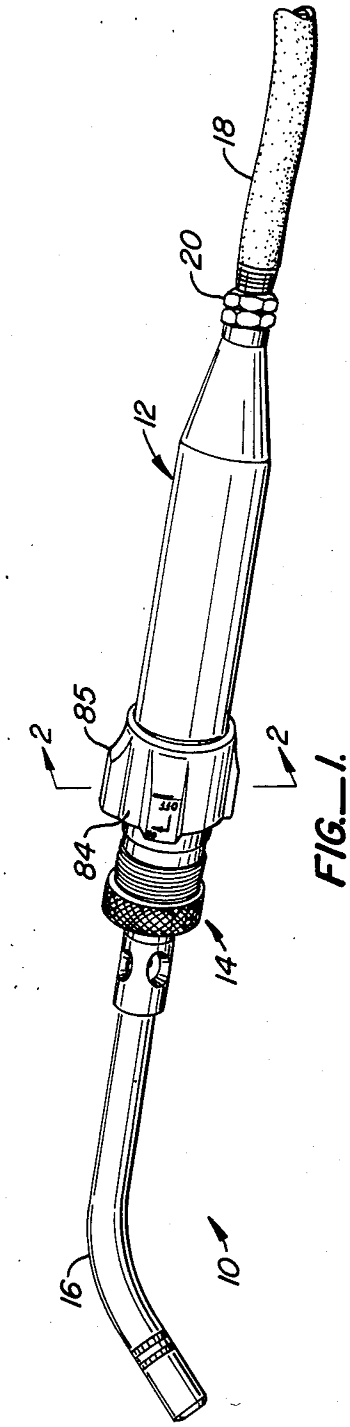
FIG. 1 is an isometric view of a torch assembly including the cam-actuated valve of the instant invention.

In FIG. 1, there is shown an overall view of the mono-propellant soldering and brazing torch generally at 10. The torch includes a generally elongated handle adapted for manual gripping shown generally at 12. Quick disconnect coupling assembly 14 at the outlet end of the handle permits removable connection of a torch tip 16 thereto. The opposite end of the handle is connected to a mono-propellant gas supply such as propane (not shown) by means of a gas supply hose 18. Hex nuts 20 allow removable connection of the supply hose to the handle. Positioned at the outlet end of the handle is a coupling and valve body 22.

Figure 2:
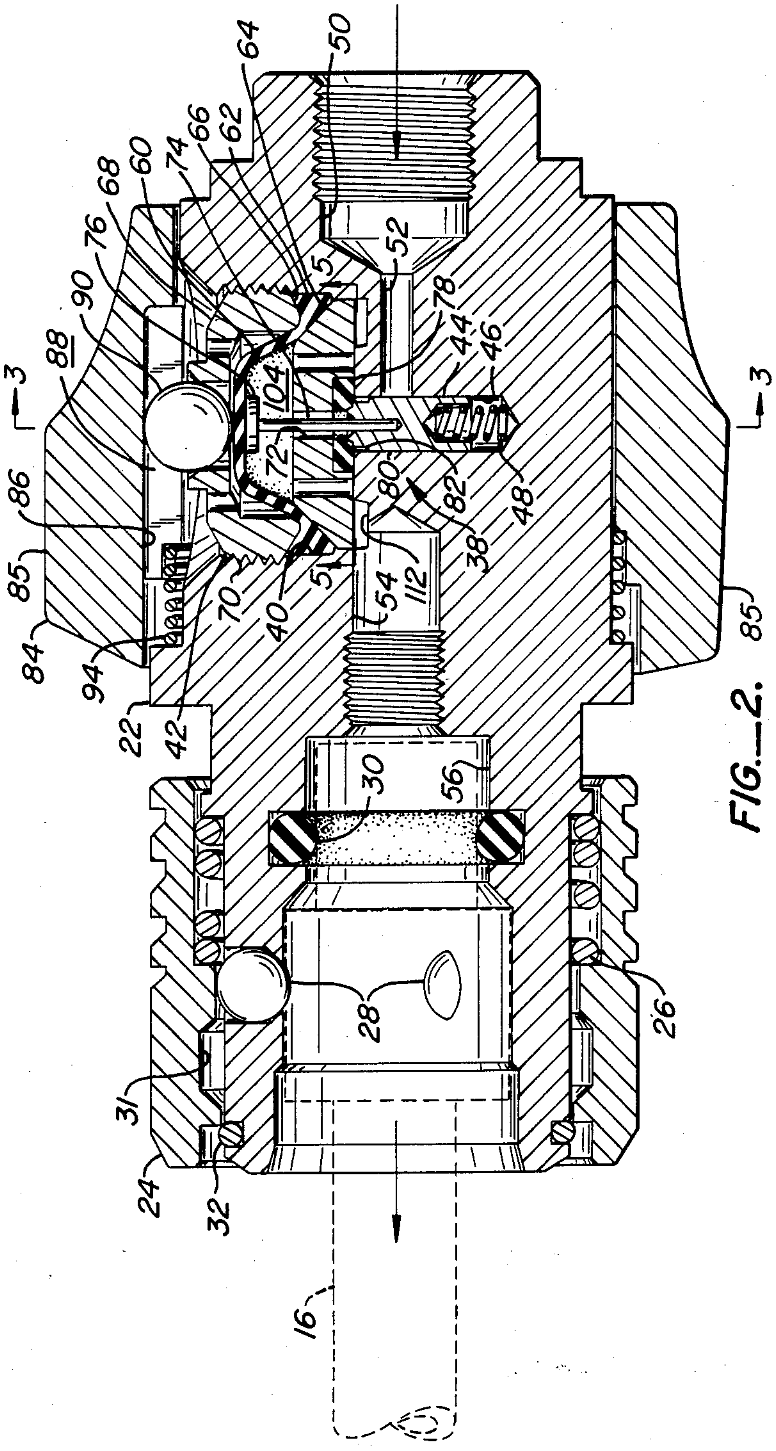
FIG. 2 is a cross-sectional elevation view of the valve and a coupling assembly taken along lines 2—2 in FIG. 1.

Turning now to FIG. 2, the coupling and valve body 22 is shown to be generally elongated, of a generally cylindrical configuration, and defining a longitudinal axis. The quick disconnect coupling assembly 14 is positioned at the outlet end of the body 22. The coupling assembly consists of a coupling sleeve 24 of generally annular shape which is spring-biased by means of a coil spring to the forwardmost position shown in the drawing. In this position, three balls, two of which are shown at 28, are positioned in radially innermost position so as to engage corresponding depressions (not shown) in tip 16. In this manner, tip 16 is retained within coupling assembly 14. When it is desired to remove the tip, coupling sleeve 24 is manually moved in the rearward or inlet direction so that balls 28 may be forced radially outwardly into internal annular groove 30 within coupling sleeve 24. Suitable O-ring seals 30, 32 serve to seal the coupling assembly. These seals may be made of resilient material such as rubber.

Turning now to the opposite end of body 22, a valve assembly 38 is shown contained within a radial bore 40 in body 22. The valve assembly comprises a disc-shaped valve seat 42 contained within the bottom of bore 40. The generally cylindrical valve poppet 44 slidingly contained within a bore 46. The poppet is spring-biased by means of valve spring 48 into a radially outward direction.

A stepped inlet passage 50, 52 accesses bore 46 intermediate the ends thereof at a position where it is normally obturated by poppet 44 in a closed position as shown. A stepped outlet passage 54, 56 directs fluid to the tip 16 within coupling assembly 14.

Within the valve chamber 40 is a diaphragm 60 of resilient material such as rubber. The diaphragm has a dome-shaped portion and a circumferential rib 62. The diaphragm is retained by means of the rib between a tapered annular surface 64 on the top of valve seat 42 and a reverse tapered annular surface 66 on a generally cylindrical retainer 68 threadably contained within chamber 40 by means of threads 70.

An aperture 72 positioned in the center of the valve seat 42 allows the valve stem 74 to extend between the dome-shaped portion of diaphragm 60 and poppet 44. A disc-shaped head 76 is fixed to the radially outermost end of valve stem 74. The radially innermost end of valve stem 74 passes through aperture 72 and is fixed to poppet 44. O-ring seal 78 is located intermediate valve seat 64 and the radially outermost end 80 of poppet 44. The seal may be made of rubber or other resilient material. End 80 of poppet 44 is hex-shaped so as to create a plurality of passages 82 between the poppet and the wall of bore 46. The points of the hexagonal shape are coincident with the outer diameter of the generally cylindrical poppet so as to provide a close fit within bore 46 for guiding the poppet.

An actuator sleeve 84 is positioned for a rotational and longitudinal motion on body 22. The sleeve has a plurality of spaced ribs 85 thereon to facilitate manual movement of sleeve.

Figure 3:
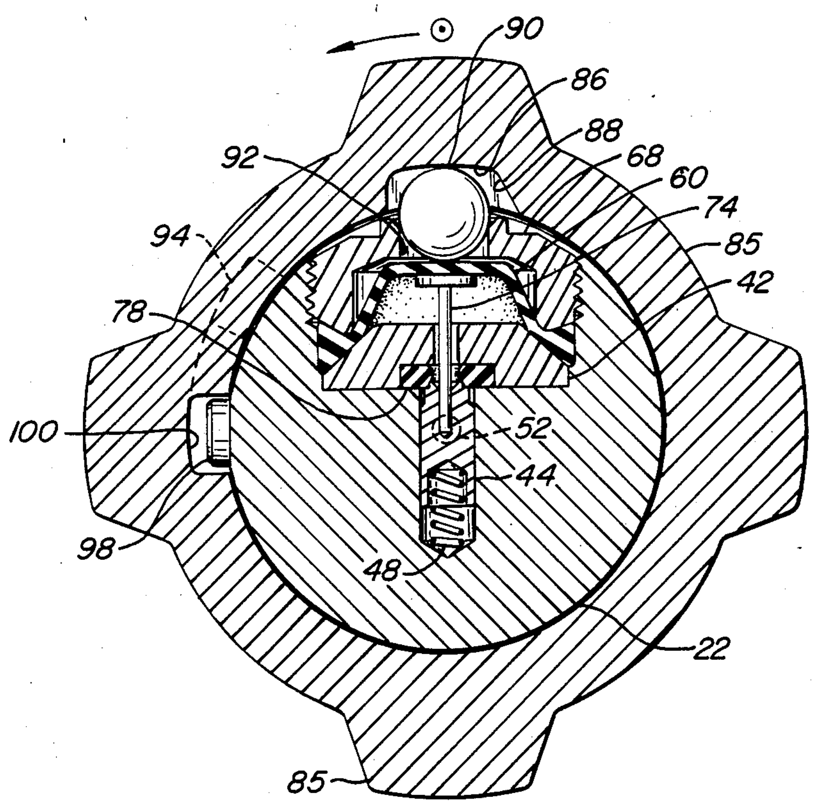
FIG. 3 is a cross-sectional elevation view of the valve taken along lines 3—3 in FIG. 2 in the fully closed position.
Figure 4:
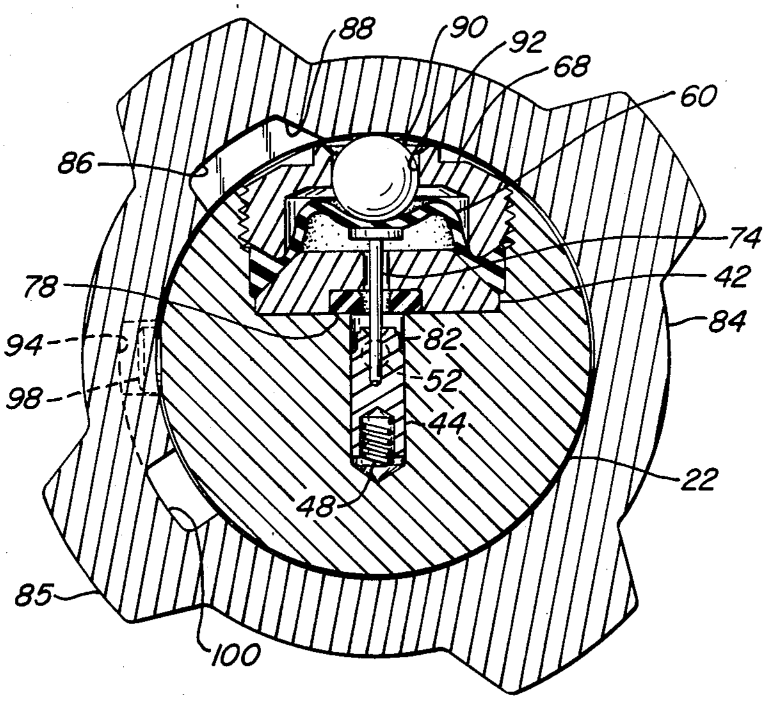
FIG. 4 is a cross-sectional view similar to FIG. 3 but showing the actuator sleeve rotated and the valve in the fully-opened position.
Figure 6:
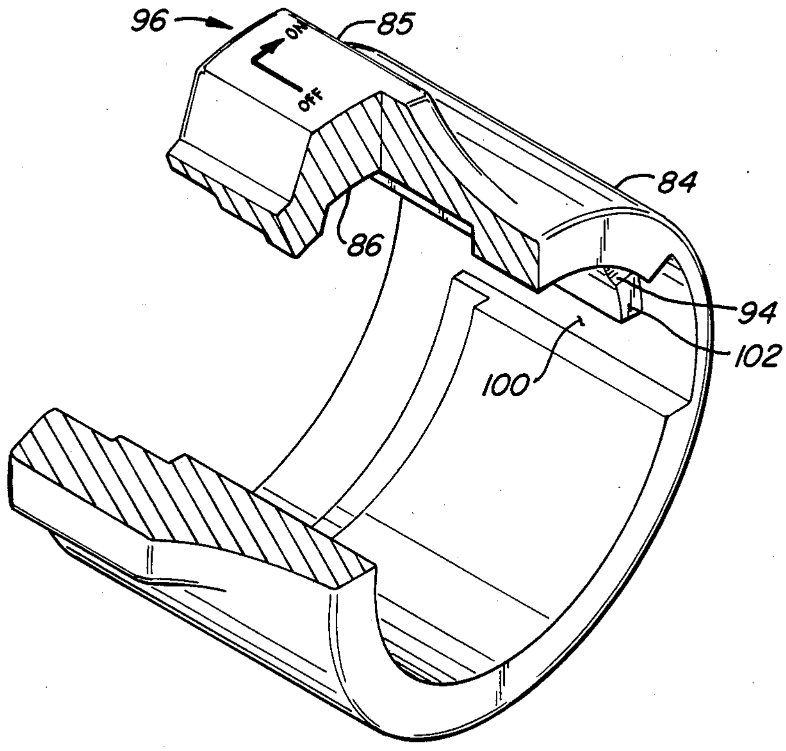
FIG. 6 is a top quarter isometric view of the actuator sleeve partially cut away to show details thereof.

As seen in this figure and also in FIGS. 3 and 4, a cam surface 86 is contained within the inner portion of actuator sleeve 84 and bears against the cam member or ball 90. As may be seen, ball 90 is loosely fitted within an aperture 92 located within diaphragm retainer 68. The locking mechanism is provided whereby the actuator sleeve 84 may not be rotated until it is first moved longitudinally against a spring 94 as seen in FIG. 2. As seen in FIG. 6, the locking mechanism includes a groove 94 which is positioned on the inner wall of actuator sleeve 84. Indicia 96 are contained on one of ribs 85 to denote the "off" and "on" positions, respectively.

Returning to FIG. 3, the valve is shown in the normally closed or "off" postion with inlet passage 52 obturated by poppet 44. In this position, ball 90 is in its radially outermost position contacting cam surface 86. A generally cylindrical detent 98 located on body 22 ninety degrees from ball 90 ensures longitudinal and nontransverse movement of actuator sleeve 84 in the direction of the viewer. Note in this figure and in FIG. 6 a channel 100 which permits and guides this motion. When the sleeve is manually moved in the longitudinal direction so that detent 98 clears an end wall 102 on the interior of sleeve 85 (see FIG. 6), the sleeve is permitted to rotate approximately thirty degrees in the arrow direction as seen in FIG. 3. Releasing the sleeve will cause the detent to position itself in groove 94, thereby providing a positive feel for the locking the valve in the closed or "off" position (see FIGS. 4 and 6).

As best seen in FIG. 4, this rotation of the sleeve will cause the ball to be radially inwardly directed by means of ramp 88 moving thereover until the position shown in the Figure is achieved. In this position, ball 90 moves within aperture 92 of retainer 68 to depress valve stem 74 and thereby poppet 44. In doing so, grooves 82 on poppet 44 allow fluid communication from inlet passage 52 through O-ring seals 78 and into aperture 72 in valve seat 42.

Figure 5:
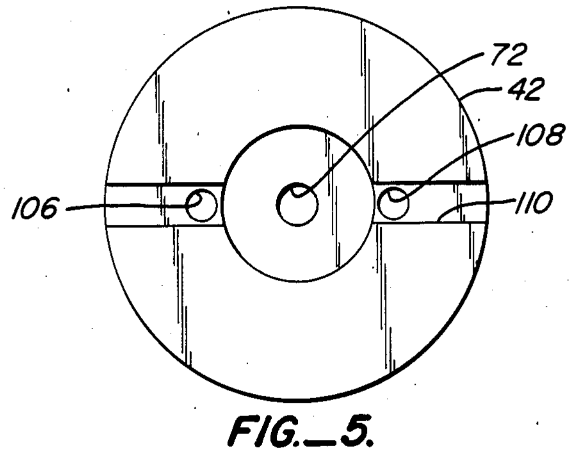
FIG. 5 is a top plan view of the retainer seat taken along lines 5—5 in FIG. 2.

As best seen in FIG. 2, fluid is allowed to enter chamber 104 formed between diaphragm 60 and valve seat 42. As seen in FIG. 5, fluid then flows through a pair of passages 106, 108 in valve seat 42. As shown in this figure and in FIG. 2, fluid is then allowed to flow through cross slot 110. Fluid then passes around annular groove 112 and bends into passages 54, 56. From here, fluid flows into tip 16.

As may be seen, diaphragm 60 provides a fluidtight connection between valve assembly 38 exterior the body 22. When it is desired to turn the valve off, the actuator sleeve 85 is rotated in the opposite direction, ball 90 again returns to its seated position against cam surface 86. Spring 94 causes the actuator sleeve 84 to move in a longitudinal direction and rotational movement is further prevented by means of channel 100, as aforementioned.

It is to be understood that while the invention has been described above in conjunction with the preferred specific embodiment thereof, that the description is intended to illustrate and not limit the scope of the invention, which is defined by the scope of the appended claims.

We claim:

1. A valve comprising, (a) a body defining a longitudinal axis,
(b) an inlet in said body,
(c) an outlet in said body,
(d) a valve chamber in said body in fluid communication with said inlet and said outlet,
(e) valve means in said chamber for selectively closing off communication between said inlet and said outlet, said valve means comprising,
  (1) a valve seat,
  (2) a valve poppet, and
  (3) valve spring means biasing said poppet toward said valve seat,
(f) actuator means on said body for actuating said valve means, said actuator means being rotatable from a first angular position wherein said valve means is closed to a second angular position wherein said valve means is open,
(g) a resilient diaphragm in said valve chamber intermediate said actuator means and said valve means for sealing said valve means so as to prevent egress of fluid contained therein except by way of said inlet or said outlet,
(h) means defining an aperture through said valve seat, and (i) a valve stem passing through said valve seat aperture, said valve stem defining a pair of ends, one end of said valve stem being fixed to said poppet, and the other end being positioned to be in contact with said diaphragm whereby movement of said diaphragm in the direction of said valve by said actuator means moves said poppet away from sealing engagement with said seal means wehreby fluid may flow through said valve from said inlet to said outlet.

2. The invention of claim 1 wherein:

actuator means comprises an annular sleeve on said body defining an interior cam surface, said cam surface being movable by rotation of said sleeve so as to actuate said valve means.

3. The invention of claim 2 wherein said body is generally elongated, said sleeve being positioned on said body for both axial and rotational movement, and locking means on said cam surface whereby said sleeve must be first moved axially before it may be moved rotationally so as to avoid accidental rotation.

4. The invention of claim 3 further including spring means biasing said sleeve in a direction to engage said locking means and thereby prevent rotation of said sleeve unless said sleeve is first moved axially against the biasing force of said spring means.

5. The invention of claim 4 further including seal means intermediate said valve seat and said valve poppet for preventing flow through said valve when said valve poppet is biased against said seal means.

6. The invention of claim 1 wherein said cam means comprises a ball and further including a retainer in said valve chamber defining an aperture therein loosely fitted around said ball for guidance thereof.

7. The invention of claim 5 wherein said seal means is an O-ring of resilient material.

* * * * *

UNITED STATES PATENT AND TRADEMARK OFFICE
CERTIFICATE OF CORRECTION

PATENT NO. : 4,667,931

DATED : May 26, 1987

INVENTOR(S) : Egert et al.

It is certified that error appears in the above-identified patent and that said Letters Patent is hereby corrected as shown below:

Col. 6, line 14: "claim 1" should be --claim 2--.

Signed and Sealed this

Fifteenth Day of September, 1987

*Attest:*

DONALD J. QUIGG

*Attesting Officer* *Commissioner of Patents and Trademarks*